United States Patent
Caillot et al.

(10) Patent No.: US 10,618,501 B2
(45) Date of Patent: Apr. 14, 2020

(54) MOTOR VEHICLE WASHER FLUID DISTRIBUTION DEVICE AND WIPING SYSTEM

(71) Applicant: Valeo Systèmes d'Essuyage, Le Mesnil Saint Denis (FR)

(72) Inventors: Gérald Caillot, Cernay la Ville (FR); Vincent Izabel, Chilly Mazarin (FR); Jean-Michel Jarasson, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 271 days.

(21) Appl. No.: 15/398,801

(22) Filed: Jan. 5, 2017

(65) Prior Publication Data

US 2017/0190320 A1    Jul. 6, 2017

(30) Foreign Application Priority Data

Jan. 6, 2016  (FR) ...................................... 16 50082

(51) Int. Cl.
| | |
|---|---|
| *B60S 1/38* | (2006.01) |
| *B60S 1/40* | (2006.01) |
| *B60S 1/48* | (2006.01) |
| *F16L 53/38* | (2018.01) |
| *B60S 1/52* | (2006.01) |

(52) U.S. Cl.
CPC ............... *B60S 1/487* (2013.01); *B60S 1/488* (2013.01); *B60S 1/524* (2013.01); *F16L 53/38* (2018.01); *B60S 1/52* (2013.01)

(58) Field of Classification Search
CPC .... B60S 1/40; B60S 1/48; B60S 1/488; B60S 1/52; B60S 1/524
See application file for complete search history.

(56) References Cited

U.S. PATENT DOCUMENTS

| 6,186,156 B1 | 2/2001 | Schlein | |
|---|---|---|---|
| 2013/0156410 A1* | 6/2013 | Jarasson | ................. B60S 1/488 |
| | | | 392/441 |
| 2014/0259503 A1* | 9/2014 | Caillot | ................... B60S 1/488 |
| | | | 15/250.01 |
| 2014/0352095 A1* | 12/2014 | Caillot | ................... B60S 1/488 |
| | | | 15/250.01 |

FOREIGN PATENT DOCUMENTS

| CN | 103434488 A | 12/2013 | |
|---|---|---|---|
| CN | 103764459 A | 4/2014 | |
| CN | 104071128 A | 10/2014 | |
| EP | 2272727 A2 * | 1/2011 | ............ B60S 1/3805 |
| EP | 2777996 A1 | 9/2014 | |

OTHER PUBLICATIONS

First Office Action in corresponding Chinese Application No. 201710003753.1, dated Oct. 31, 2018 (12 pages).

* cited by examiner

*Primary Examiner* — Michael D Jennings

(74) *Attorney, Agent, or Firm* — Osha Liang LLP

(57) ABSTRACT

The present invention relates to a washer fluid distribution device (1) comprising a connectors support (9) comprising a base (31) equipped with a fixing device (18) configured to hold at least one hydraulic coupling (7, 8) at a location on the base (31), characterized in that a housing (35) accommodating a heating element (36) of the distribution device (1) is formed in the connector support (9), a wall portion delimiting the housing (35) being intended to be in contact with the at least one hydraulic coupling (7, 8).

15 Claims, 3 Drawing Sheets

MOTOR VEHICLE WASHER FLUID DISTRIBUTION DEVICE AND WIPING SYSTEM

Figure 1:
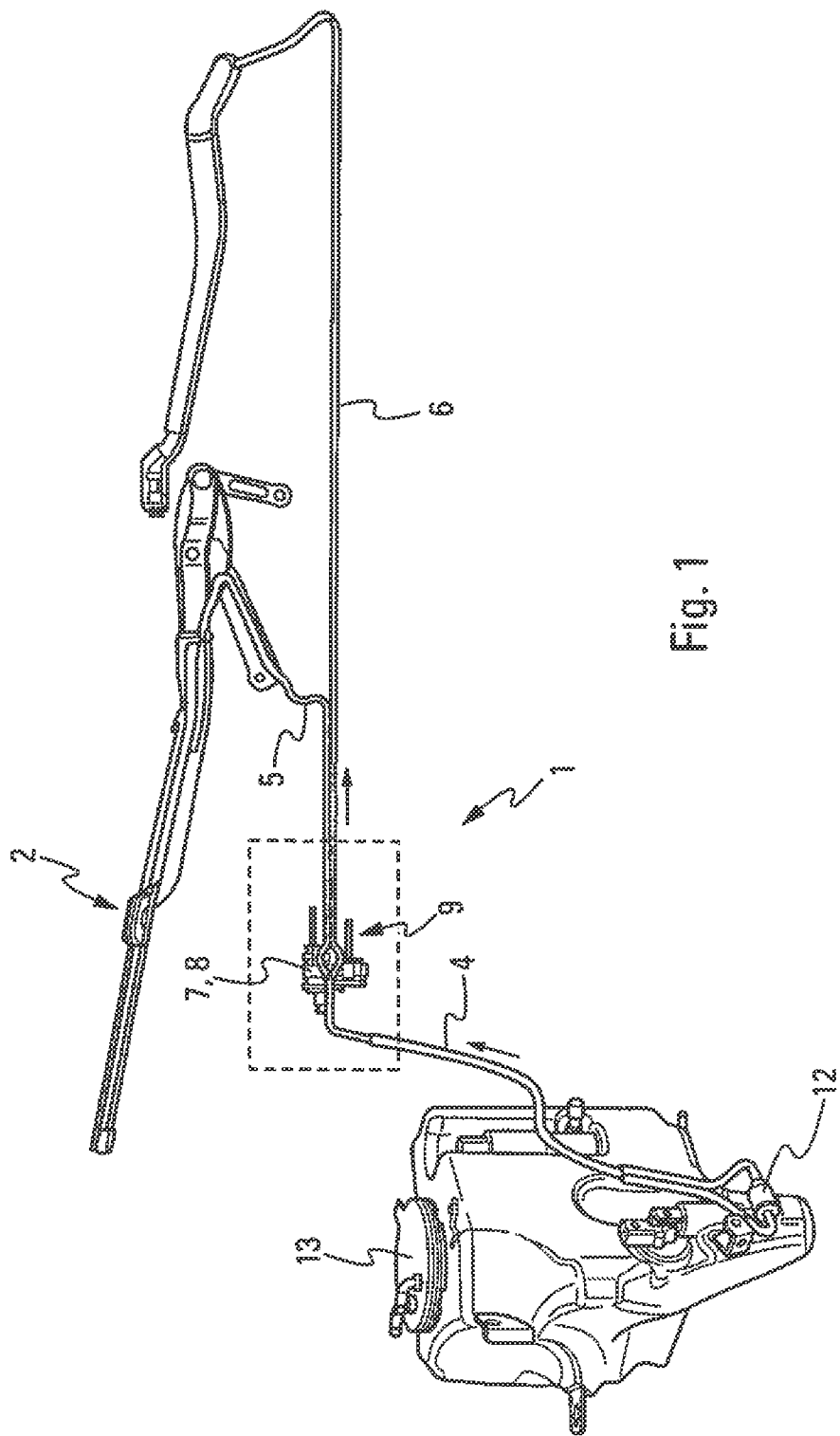

The present invention relates to a washer fluid distribution device, particularly for motor vehicle wipers. The invention also relates to a washing and/or wiping system comprising a washer fluid distribution device.

Within the context of the present invention a washer fluid means any liquid of the screen wash type suited to cleaning a glazed surface of a vehicle, particularly the cleaning associated with the use of a wiper.

Motor vehicles are commonly equipped with windscreen wiper systems that serve to provide the driver with a clear view of his surroundings, particularly in inclement weather. Such a system generally comprises at least one wiper, which scrapes the exterior surface of the windscreen, in order to move any water and/or snow present on this surface away from the field of view of the driver.

It is also known practice for vehicles to be equipped with a washing system designed to spray a washer fluid onto the windscreen, to make it easier to dissolve dirt and thus improve the quality of the cleaning of this windscreen particularly under the action of the wiping system. In one version of the washing system the latter comprises nozzles situated on the vehicle. In another version a wiper has been proposed that comprises its own washer fluid spray element. In other words, the spraying of the washer fluid is from the wiper itself, from a spray nozzle or from nozzles distributed along the said wiper.

Certain wipers comprise one or more spray lines provided with one or a multitude of pressurized wetting orifices or nozzles, that allow the washer fluid to be distributed over the glazed surface. The nozzles are supplied with washer fluid contained in a reservoir via a pump.

In order notably to be able to dismantle the wipers and replace them, use is made of a network of pipes in which a main hydraulic pipe is coupled to a washer fluid pump of the motor vehicle and to two secondary hydraulic pipes, for example wiper pipes, via a hydraulic coupling. The main hydraulic pipe and the hydraulic coupling are generally arranged under the bonnet of the motor vehicle, namely in the engine compartment of the motor vehicle, while the secondary hydraulic pipes are chiefly on the outside of the engine compartment, for example the secondary hydraulic pipes of the wipers are incorporated into the wiper arms.

When the exterior temperature is too low, for example below 5° C., the washer fluid may be warmed up/defrosted by heating the hydraulic pipes through which the washer fluid circulates. Thus, the washer fluid is warmed up and conveyed through the pipes as far as the spray lines or nozzle(s) without obstacle in the washer fluid circulation ducts.

However, a cold zone may arise in the zone where the hydraulic pipes are coupled, and this may disrupt the circulation of the washer fluid in the event of freezing, or may even completely block same.

It is one of the objects of the present invention to at least partially alleviate these disadvantages by proposing an improved washer fluid distribution device that makes it possible to avoid cold zones at the junction between the main hydraulic pipe and the secondary hydraulic pipes, that is low in cost, small in bulk, but also robust and easy to assemble or to dismantle.

To this end, one subject of the present invention is a washer fluid distribution device, in particular for wipers, comprising a connectors support comprising a base equipped with a fixing device configured to hold at least one hydraulic coupling at a location on the base, characterized in that a housing accommodating a heating element of the distribution device is formed in the connector support, a wall portion delimiting the housing being intended to be in contact with the at least one hydraulic coupling.

The base thus ensures the transfer of heat by conduction between the heating element and the at least one hydraulic coupling in order to warm the latter. The use of a heating element that is independent of the specific means of heating the hydraulic pipes makes it possible to heat hydraulic couplings of hydraulic pipes that are not themselves heated.

As the heating element is fixed to the base, which is itself fixed to the vehicle, the heating element is firmly anchored to the connectors support.

Furthermore, the base has a significant thickness of material around the housing, thereby allowing a good exchange of heat with the at least one hydraulic coupling.

According to one or more features of the distribution device, considered alone or in combination:
- the housing accommodates a heat-conducting resin coating the heating element, the heat-conducting resin being in contact with the walls of the housing,
- the connector support comprises a retaining cap collaborating with the base to be fixed to the base over the location of the at least one hydraulic coupling that is intended to be held in place by the fixing device,
- the retaining cap is fixed to the base by clip-fastening,
- the housing is formed in a retaining cap of the connectors support,
- the retaining cap is made of a heat-conducting plastic material or of a metallic material,
- the housing is formed in the base of the connectors support underneath the location for the at least one hydraulic coupling intended to be held in place by the fixing device,
- the base of the connectors support is made of a heat conducting plastic material or of a metallic material,
- the housing has at least one lateral opening for the passage of the electric wires of the heating element,
- the fixing device has a cavity of cylindrical overall shape defining the location intended to accommodate the at least one hydraulic coupling, the said cavity having:
  - a first opening configured for the passage of at least one inlet of the at least one hydraulic coupling,
  - a second opening configured for the passage of at least one first outlet of the at least one hydraulic coupling, and
  - a third opening configured for the passage of at least one second outlet of the at least one hydraulic coupling.

Another subject of the invention is a washing and/or wiping system characterized in that it comprises a distribution device as described hereinabove.

Figure 2:
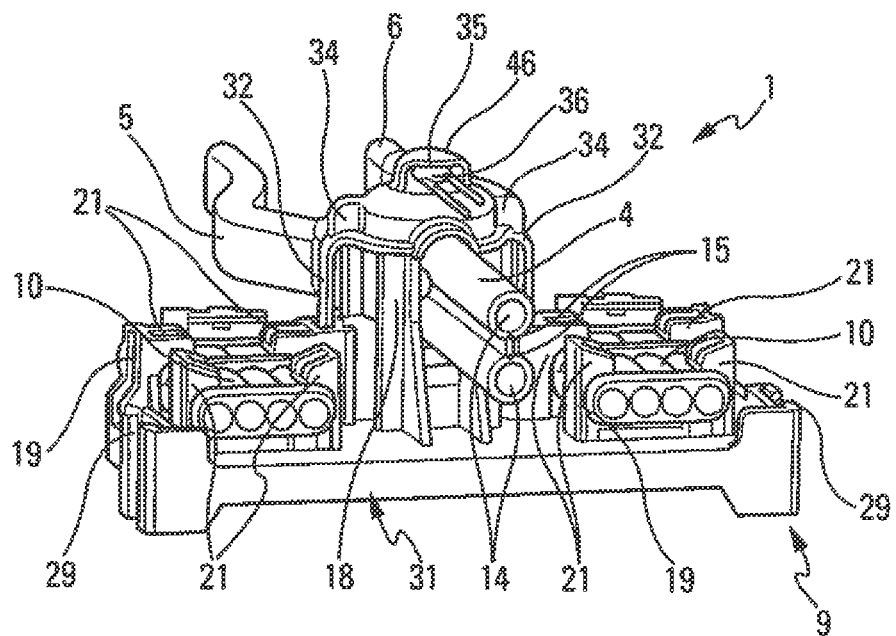
Figure 3:
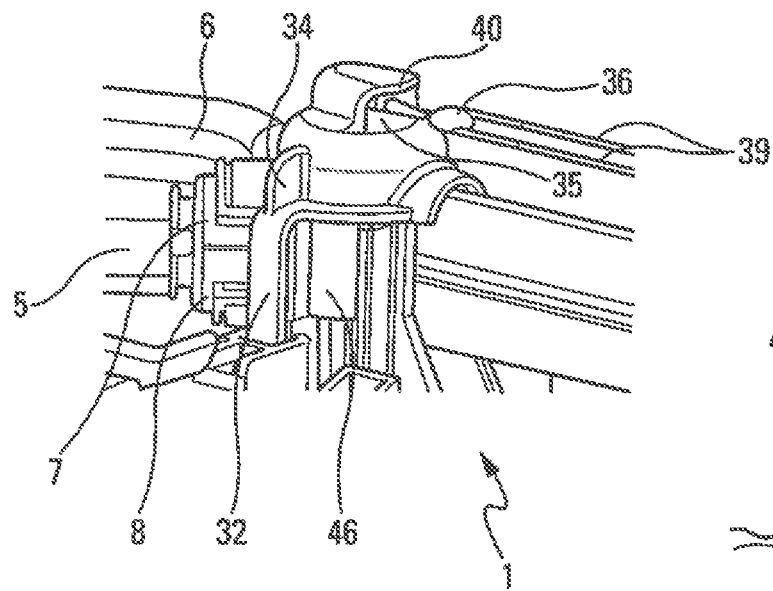
Figure 4:
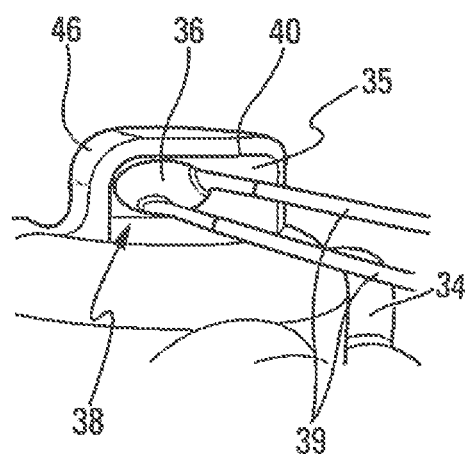
Figure 5:
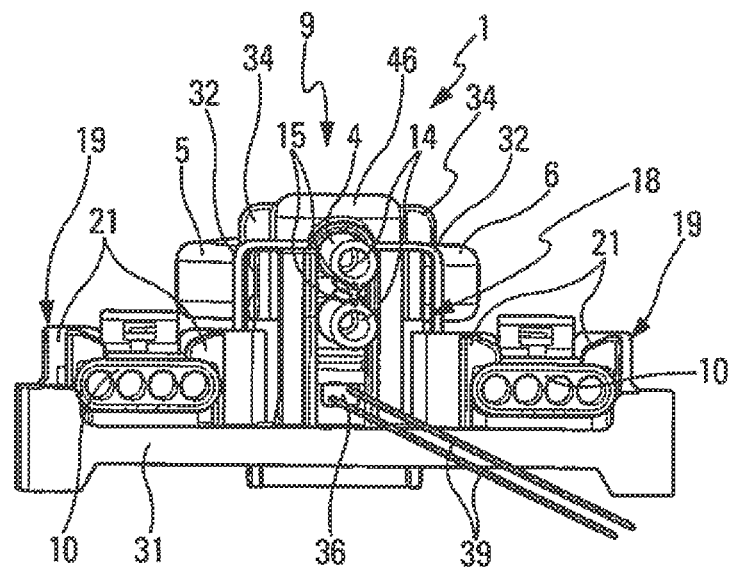
Figure 6:
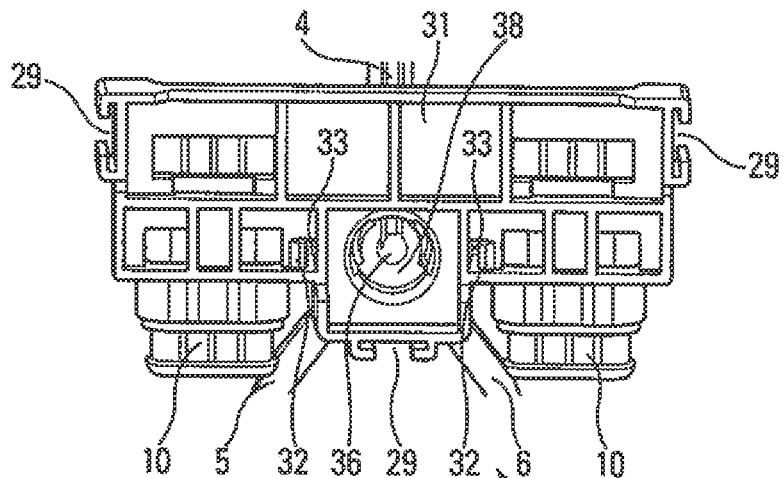
Figure 7:
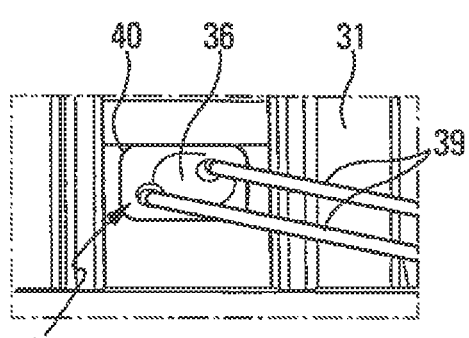
Figure 8:
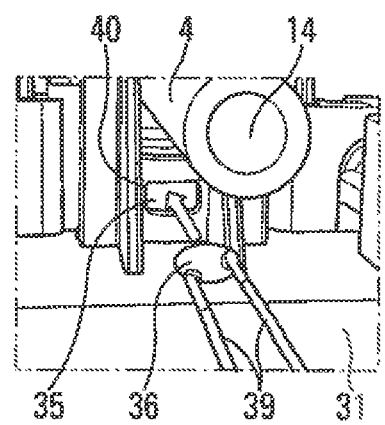

Further features and advantages of the invention will become apparent from the following description, given by way of nonlimiting example, with reference to the attached drawings in which:

FIG. 1 is a schematic view of elements of a motor vehicle's washer fluid distribution device according to a first embodiment, FIG. 2 is an enlarged and perspective view of the portion enclosed in dotted lines of the distribution device of FIG. 1, FIG. 3 depicts the distribution device of FIG. 2 during its manufacture, FIG. 4 depicts an enlarged view of a detail of the distribution device of FIG. 1, FIG. 5 is a perspective view of the washer fluid distribution device according to a second embodiment, FIG. 6 is a view from beneath of the distribution device of FIG. 5, FIG. 7 is an enlarged view of a detail of the distribution device of FIG. 6, and FIG. 8 is an enlarged view of a detail of the distribution device of FIG. 5 during its manufacture.

In these figures, elements that are identical bear the same reference numerals.

The following embodiments are examples. Although the description refers to one or more embodiments that does not necessarily mean that each reference relates to the same embodiment or that the features apply only to one single embodiment. Simple features of various embodiments may also be combined to form other embodiments.

FIG. 1 depicts a schematic overview of a washing and wiping system comprising a washer thud distribution device 1, a main hydraulic pipe 4, two secondary hydraulic pipes 5, 6 and two motor vehicle wipers 2 (just one wiper is depicted in FIG. 1).

The washer fluid distribution device 1 comprises at least one hydraulic coupling 7, 8 and a connectors support 9.

The main hydraulic pipe 4 and the secondary hydraulic pipes 5, 6 for example comprise a respective sleeve in which one or two circulation ducts 14 are formed for the circulation of the washer fluid.

The sleeve is made of a soft material, for example rubber.

The main hydraulic pipe 4 is coupled on the one hand to a pump 12 of the wiping system, the pump 12 itself being coupled to a reservoir 13 of the wiping system and, on the other hand, to at least one inlet of the at least one hydraulic coupling 7, 8. The secondary hydraulic pipes 5, 6 are coupled to at least one outlet of the at least one hydraulic coupling 7, 8 and to the respective spray lines of the wipers 2.

The hydraulic coupling 7, 8 is, for example, a T-shaped or Y-shaped tubular element allowing washer fluid to be branched off from the main hydraulic pipe 4 and led towards each of the two secondary hydraulic pipes 5, 6.

The hydraulic coupling 7, 8 may be fitted with a nonreturn valve. The nonreturn valve allows the pumped liquid to pass in the direction of circulation heading from the pump 12 towards the spray line and blocks the return of the stream of pumped liquid in the other direction, namely from the wipers 2 towards the pump 12. The nonreturn valve thus prevents any liquid from flowing back from the wipers 2 towards the pump 12, notably when distribution of lipoid in a circulation duct 14 is halted.

It is of course possible to use other types of hydraulic coupling, without nonreturn valves, simply allowing the washer fluid to circulate from the ducts 14 of the main hydraulic pipe 4 towards the ducts 14 of the secondary hydraulic pipes 5, 6.

The connectors support 9 comprises a base 31 comprising a fixing device 18 configured to hold the at least one hydraulic coupling 7, 8 in position at a location 30 of the base 31.

The fixing device 18 able to hold the at least one hydraulic coupling 7 in position may be designed to hold the at least one hydraulic coupling 7, 8 removably.

It comprises for example a cavity of substantially cylindrical overall shape.

The cavity has a first opening configured for the passage of an inlet of at least one hydraulic coupling 7, 8, a second opening configured for the passage of at least one first outlet of the at least one hydraulic coupling 7, 8 and a third opening configured for the passage of at least one second outlet of the at least one hydraulic coupling 7, 8.

In the two-line-set embodiment for wipers that have two spray lines, the distribution device 1 comprises two hydraulic couplings 7, 8 which may be superposed one above the other so that the inlet ports of the respective hydraulic couplings 7, 8 are superposed being substantially mutually parallel and so that the outlet ports of the respective hydraulic couplings 7, 8 are likewise superposed and substantially mutually parallel.

The two hydraulic couplings 7, 8 are independent of one another but may be produced as a single piece or separately.

The connector support 9 may further comprise a retaining cap 46.

The retaining cap 46 collaborates with the base 31 of the connectors support 9 to be fixed to the base 31 over the location of the at least one hydraulic coupling 7, 8 held in place by the fixing device 18. Once fixed to the base 31, the retaining cap 48 presses the at least one hydraulic coupling 7, 8 into the cavity of the fixing device 18 of the base 31. The retaining cap 46 thus improves the retention of the at least one hydraulic coupling 7, 8.

The retaining cap 46 for example takes the form of a cover partially enveloping one face of a hydraulic coupling 7. The cover may have lateral cut-outs for the passage of the inlet and outlet ports of the at least one hydraulic coupling 7, 8.

The retaining cap 45 may be fixed to the base 31 by clip fastening.

It comprises for example at least two diametrically opposed elastic tabs 32 extending at right angles to the cover and configured to fit elastically into two complementary orifices 33 formed in the base 31 of the connectors support 9 (FIG. 6).

The retaining cap 46 may also comprise at least one spacer lug 34 (FIG. 4). Thus the elastic tabs 32 are extended on each side of the cover by a respective spacer lug 34 making it easier to disconnect the retaining cap 46.

Furthermore, a housing 35 accommodating a heating element 36 of the distribution device 1 is formed in the connector support 9 and a wait portion delimiting the housing 35 is in contact with the at least one hydraulic coupling 7, 8.

The heating element 36 is, for example, a thermistor such as one of the PTC (Positive Temperature Coefficient) type.

According to one first embodiment depicted in FIGS. 2, 3 and 4, the housing 35 is formed in the retaining cap 46 of the connectors support 9.

The wall portion delimiting the housing 35 in contact with the hydraulic coupling 7, 8 is thus formed by an internal face of the cover of the retaining cap 48.

The housing 35 may also accommodate a heat-conducting resin 38 with which the heating element 36 is coated, the heat-conducting resin 38 being in contact with the walls of the housing 35.

The heat-conducting resin 38 is, for example, poured into the housing 35 after the heating element 36 has been fitted, leaving the electric wires 39 of the heating element 36 visible (FIG. 3).

For that, the housing 35 may have a lateral opening 40 for the passage of the electric wires 39 of the heating element 36. The lateral opening 40 is for example, arranged on the same side of the connector support 9 as the side to which the main hydraulic pipe 4 is coupled.

The heat-conducting resin 36 mechanically retains the heating element 36 and ensures exchange of heat between the heating element 36 and the retaining cap 46 of the connectors support 9.

Provision is also made for the retaining cap 46 to be made of a heat-conducting plastic material or of a metallic materiel. The heat-conducting plastic material is, for example, formed of a plastic matrix Red with heat-conducting additives such as graphite, carbon, glass fibre or metallic particles.

The retaining cap 46 is, for example, made as a single piece, obtained for example by pressing when made of a metallic material such as a sheet metal or by injection or moulding when made of a heat-conducting plastic material.

The retaining cap 46 thus ensures the transfer of heat by conduction between the heating element 36 and the hydraulic coupling 7, 8 so as to heat the latter. The use of a heating element 36 independent of the heating means specific to the hydraulic pipes 4, 5, 6 allows the heating of hydraulic couplings 7, 8 of hydraulic pipes which are not themselves heated. Furthermore, it is more economical to change only the retaining cap 46 if the heating element 36 needs to be changed rather than changing the entirety of a heated hydraulic pipe that also heats the hydraulic coupling.

The main hydraulic pipe 4 and/or the secondary hydraulic pipes 5, 6 may also comprise at least one heating conductor 15, for example embedded in the mass of the sleeve (FIG. 2).

The heating conductor 15 is a resistive wire which heats the sleeve and thus heats the washer fluid circulating along the circulation duct 14. The washer fluid is thus heated when the exterior temperature is too low. In addition, given that the resistive wire is housed in the sleeve, it does not constitute any impediment to the flow of the washer fluid along the circulation duct. The heated washer fluid contributes to maintaining the washing function at low temperature, to maintaining the characteristics of the structure of the wiper and to the de-icing of the glazed surfaces.

The electrical connectors 10 electrically couple, for example, electric power supply wires (not depicted) of the motor vehicle to the respective heating conductors 15 of the secondary pipes of the wipers 5, 6.

The connectors support 9 comprises additional fixing devices 19, for example two of these, able removably to hold a respective electrical connector 10 in place. The additional fixing devices 19 for example comprise two pairs of elastic catching tabs 21 arranged symmetrically on the base 31 of the connectors support 9. The elastic catching tabs 21 can be parted elastically in order to clip the electrical connectors 10 of complementary shape.

The electrical connectors 10 may be fitted horizontally or vertically (not depicted) onto one and the same face of the base 31 of the connectors support 9 or onto opposite faces, depending on the space available around the connector support 9. The additional fixing devices 19 are, for example, arranged on each side of the fixing device 18 able to hold the at least one hydraulic coupling 7, 8 in position.

The base 31 may moreover comprise a means of securing to a motor vehicle, such as three retaining slides 29.

This same connectors support 9 may also very easily be adapted to an unheated washer fluid distribution device 1, particularly to a washer fluid distribution device for motor vehicle wipers with two spray line sets and no heating. In this case, the washer fluid distribution device has no electrical connectors 10. The main hydraulic pipe 4 and the secondary hydraulic pipes 5, 6 do not have heating conductors. Also, the connectors support 9 may be adapted to a washer fluid distribution device 1 for wipers with a single spray line, which may or may not be heated, having a single spray line for distributing the washer fluid on one side of the wiper arm (not depicted). In this case, the washer fluid distribution device comprises a single hydraulic coupling 7 and two electrical connectors 10 used to power the heating of the wiper if the wipers and/or the pipes are heated.

According to a second exemplary embodiment depicted in FIGS. 5, 6, 7 and 8, the housing 35 is formed in the base 31 of the connectors support 9, under the location for the at least one hydraulic coupling 7, 8 intended to be held in position by the fixing device 18 of the connectors support 9.

The wall portion delimiting the housing 35 in contact with the hydraulic coupling 7, 8 is thus formed by an internal face of the cavity of the fixing device 18 of the base 31 of the connectors support 9.

As before, the housing 35 may accommodate a heat-conducting resin 38 coating the heating element 36, the heat-conducting resin 38 being in contact with the walls of the housing 35.

The heat-conducting resin 38 is, for example, poured into the housing 35 after the heating element 36 has been fitted, leaving the electric wires 39 of the heating element 36 visible (FIG. 8).

For that, the housing 35 may have a lateral opening 40 for the passage of the electric wires 39 of the heating element 36. The lateral opening 40 is, for example, arranged on the same side of the connector support 9 as the side to which the main hydraulic pipe 4 is coupled.

The heat-conducting resin 38 mechanically retains the heating element 36 and ensures exchange of heat between the heating element 36 and the base 31 of the connectors support 9.

Provision is also made for the base 31 of the connectors support 9 to be made of a heat-conducting plastic material or from a metallic material. The base 31 is for example formed as a single piece, obtained for example by pressing when made of a metallic material such as a sheet metal or by injection or moulding when it is made of a heat-conducting plastic material.

The base 31 thus ensures the transfer of heat by conduction between the heating element 36 and the at least one hydraulic coupling 7, 8 so as to heat the latter. The use of a heating element 36 independent of the healing means specific to the hydraulic pipes makes it possible to heat hydraulic couplings 7, 8 of hydraulic pipes which are not themselves heated.

Because the heating element 36 is fixed to the base 31, itself fixed to the vehicle via the retaining slides 29, the heating element 36 is Firmly anchored to the connectors support 9.

Furthermore, the base 31 has a significant thickness of material around the housing 35, and this allows good exchange of heat with the at least one hydraulic coupling 7, 8.

The invention claimed is:

1. A washer fluid distribution device comprising:
    a connector support comprising a base equipped with a fixing device configured to hold at least one hydraulic coupling at a location on the base; and
    a retaining cap collaborating with the base to be fixed to the base over the location of the at least one hydraulic coupling,
    wherein a housing accommodating a heating element of the distribution device is formed in the connector support, the retaining cap forming a cover partially enveloping one face of the at least one hydraulic coupling.

2. The distribution device according to claim 1, wherein the housing accommodates a heat-conducting resin coating the heating element, the heat-conducting resin being in contact with the walls of the housing.

3. The distribution device according to claim 1, wherein the at least one hydraulic coupling holds the fixing device in place.

4. The distribution device according to claim 3, wherein the retaining cap is fixed to the base by clip-fastening.

5. The distribution device according to claim 1, wherein the retaining cap is made of a heat-conducting plastic material or of a metallic material.

6. The distribution device according to claim 1, wherein the housing is formed in the base of the connectors support underneath the location for the at least one hydraulic coupling that holds the fixing device in place.

7. The distribution device according to claim 6, wherein the base of the connectors support is made of a heat-conducting plastic material or of a metallic material.

8. The distribution device according to claim 1, wherein the housing has at least one lateral opening for passage of electric wires of the heating element.

9. The distribution device according to claim 1, wherein the fixing device has a cavity of cylindrical overall shape defining the location intended to accommodate the at least one hydraulic coupling, the said cavity having:
- a first opening configured for passage of at least one inlet of the at least one hydraulic coupling,
- a second opening configured for passage of at least one first outlet of the at least one hydraulic coupling, and
- a third opening configured for passage of at least one second outlet of the at least one hydraulic coupling.

10. The distribution device according to claim 1, wherein the fixing device is disposed on the base.

11. The distribution device according to claim 1, wherein the housing is disposed above the base.

12. A washing or wiping system, comprising:
a washer fluid distribution device, comprising:
- a connector support comprising a base equipped with a fixing device configured to hold at least one hydraulic coupling at a location on the base; and
- a retaining cap collaborating with the base to be fixed to the base over the location of the at least one hydraulic coupling,
wherein a housing accommodating a heating element of the distribution device is formed in the connector support, and the retaining cap is in the form of a cover partially enveloping one face of a hydraulic coupling.

13. A washer fluid assembly, comprising:
at least one hydraulic coupling;
at least one main hydraulic pipe configured to supply washer fluid from a pump to the hydraulic coupling;
at least one secondary hydraulic pipe configured to supply the washer fluid from the hydraulic coupling to a spraying device; and
a washer fluid distribution device, comprising:
- a connector support comprising a base equipped with a fixing device that holds the at least one hydraulic coupling at a location on the base; and
- a retaining cap collaborating with the base to be fixed to the base over the location of the at least one hydraulic coupling,
wherein a housing accommodating a heating element of the distribution device is formed in the connector support, and
wherein the retaining cap is in the form of a cover partially enveloping one face of a hydraulic coupling.

14. The washer fluid assembly according to claim 13, wherein the fixing device is disposed on the base.

15. The washer fluid assembly according to claim 13, wherein the housing is disposed above the base.

* * * * *